April 1, 1958 M. E. ACHLER ET AL 2,828,817
VENETIAN BLIND CONSTRUCTION
Filed Oct. 30, 1952 4 Sheets-Sheet 1

INVENTORS
Maurice E. Achler and
Albert H. Milstine
BY
Nathan U. Kraus
Frank D. Marks
Attorneys

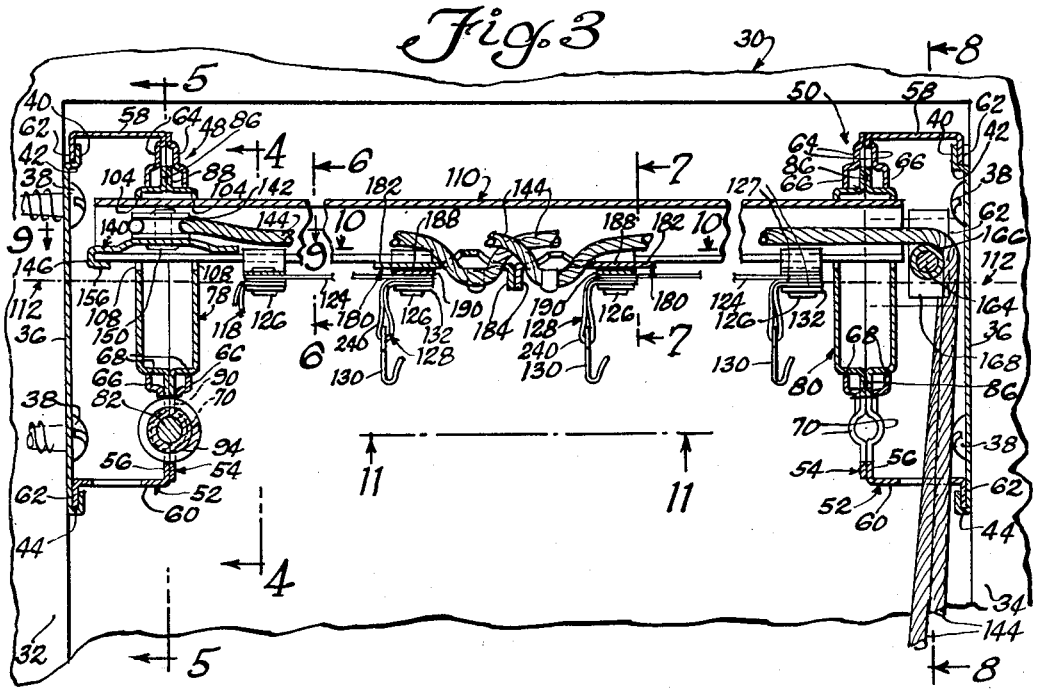
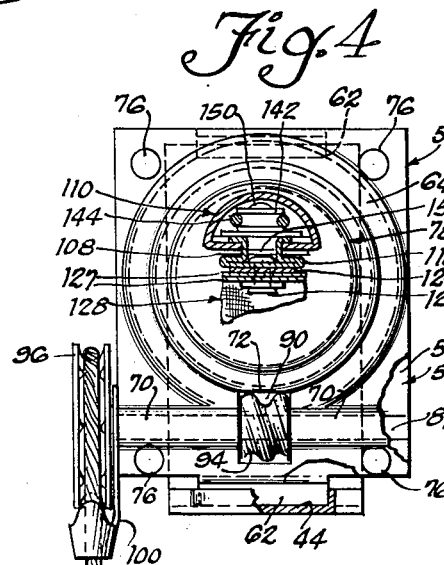
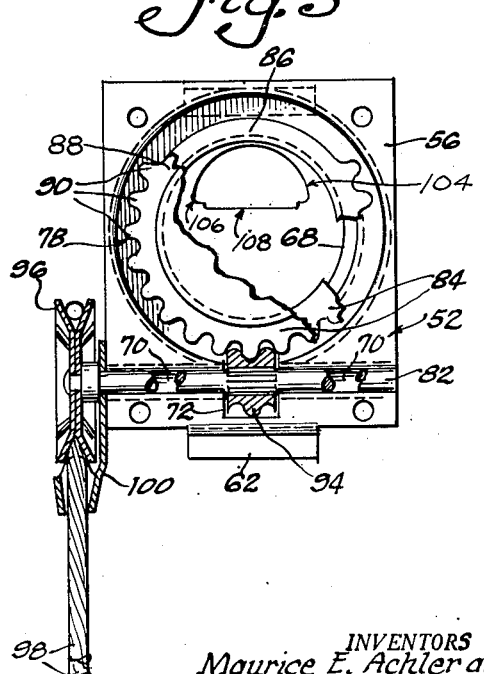
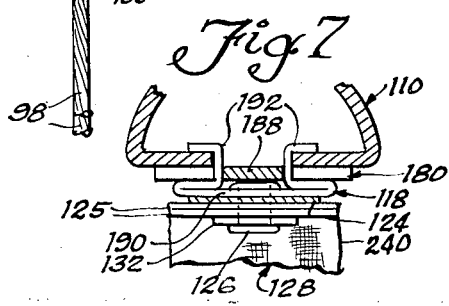

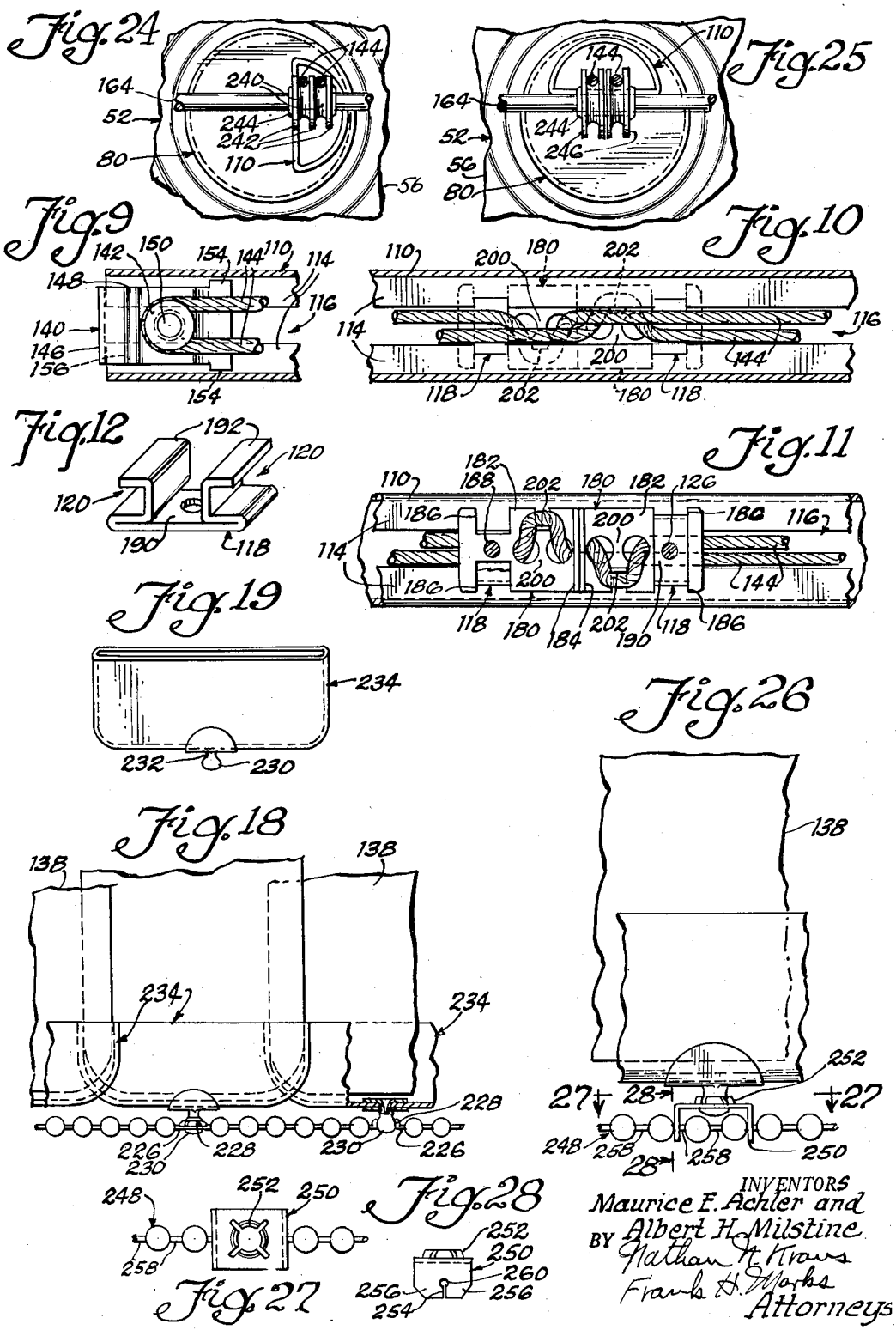

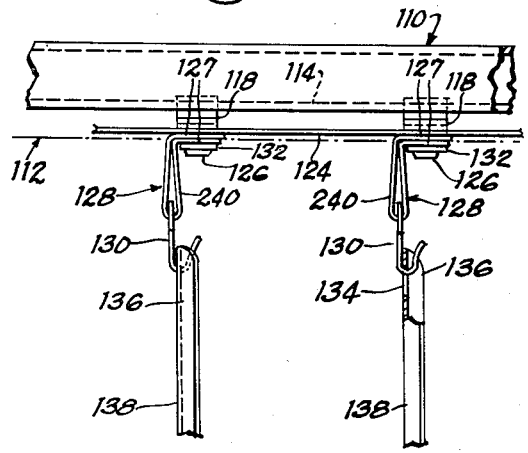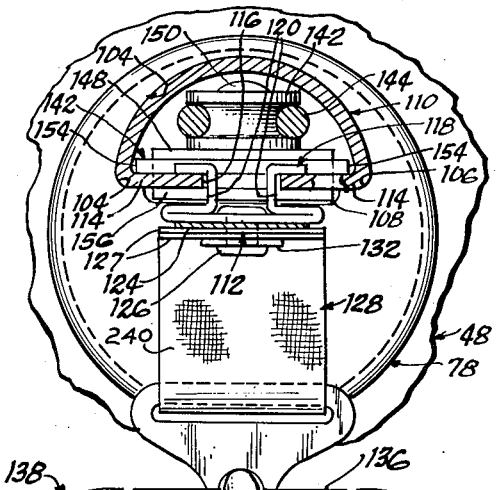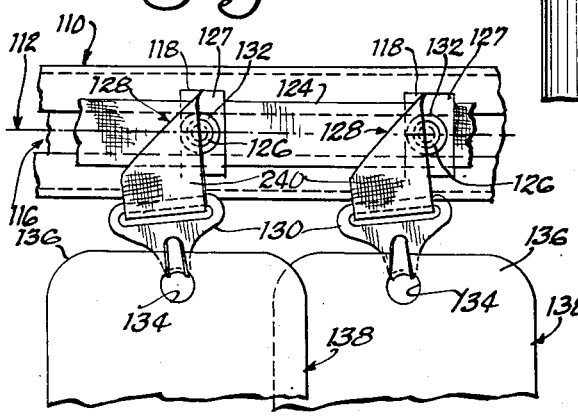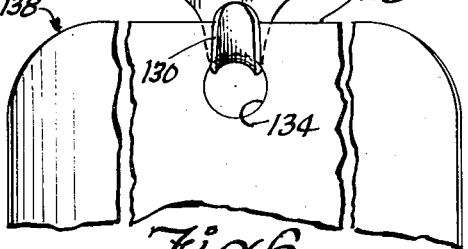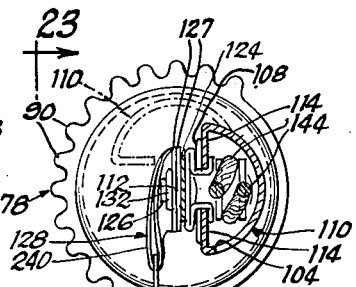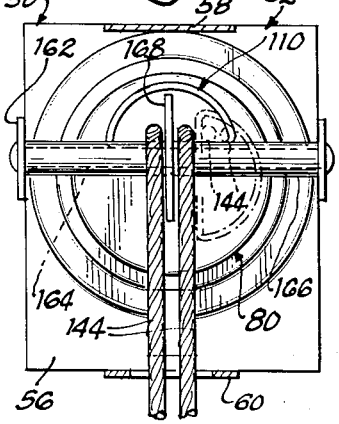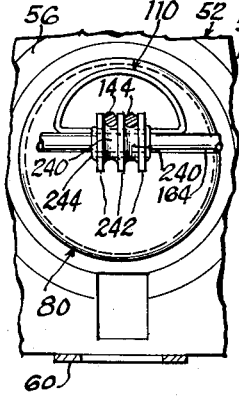

United States Patent Office 2,828,817
Patented Apr. 1, 1958

2,828,817

VENETIAN BLIND CONSTRUCTION

Maurice E. Achler and Albert H. Milstine, Chicago, Ill., assignors of one-tenth to Harry Shapiro, Chicago, Ill.

Application October 30, 1952, Serial No. 317,778

13 Claims. (Cl. 160—168)

This invention relates to vertical Venetian blinds and is more particularly concerned with improvements in the construction disclosed in our co-pending application Serial No. 278,857, filed March 27, 1952, entitled "Vertical Venetian Blind."

An object of our invention is to provide more simplified and improved tilt-tube supporting means.

Another object is to provide improved tilt-tube construction.

A further object is to provide for the turning of the vertical slats without noticeably vertically shifting them.

An additional object is to provide improved anchorage for the bottoms of the slats.

It is also an object to provide means for facilitating the installation and removal of the slats.

It is another object to provide means to insure noiceless operation.

It is a further object to guard against bowing of the bottom line of the slats.

It is an additional object to provide for simultaneous tilting and mutual approach or separation of vertical slats which do not substantially rise or descend while tilting.

Another object is to provide improved traverse cord guiding means.

Another object is to provide an improved traverse cord lock construction.

Further objects and advantages of the invention will appear as the description proceeds.

The invention will be better understood upon reference to the following description and accompanying drawings, in which:

Fig. 3 is a longitudinal sectional view of the tilt tube and associated structure.

Figs. 4 to 10 are sectional views taken as indicated by the lines 4—4 to 10—10, respectively, in Fig. 3.

Fig. 11 is a bottom plan view taken as indicated by the line 11—11 in Fig. 3.

Fig. 17 is a similar view but taken as indicated by the line 17—17 in Fig. 2.

Fig. 18 is an enlarged view of a portion at the bottom of Fig. 1, with the slats fully lapped as shown in dot-dash lines in Fig. 15.

Fig. 19 is an isometric view of a cap for receiving the bottom of each slat.

Fig. 20 is a front elevational view of the intermediate portion of the tilt tube and associated structure as seen in Fig. 8.

Fig. 21 is a sectional view with the tilt tube shown in dot-dash lines in another adjustment.

Fig. 22 is a view similar to Fig. 20 but with the parts in the adjustment indicated by the full lines in Fig. 21.

Figs. 23 and 24 are views similar to Fig. 8 but show a modified traverse cord guide roller construction.

Fig. 25 shows another form of cord guide.

Fig. 26 is similar to Fig. 18 but shows a modified bottom chain socket construction.

Figure 1:
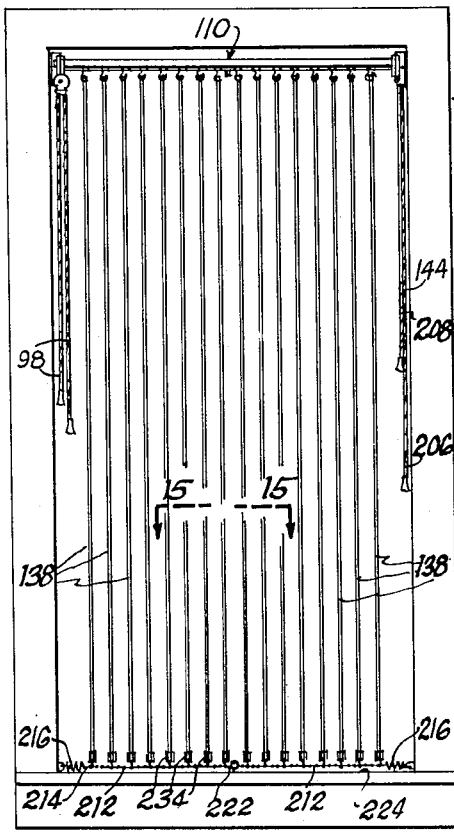
Fig. 1 is a front elevational view of a vertical Venetian blind embodying features of the invention, the slats being shown uniformly spaced throughout the width of the window.
Figure 2:
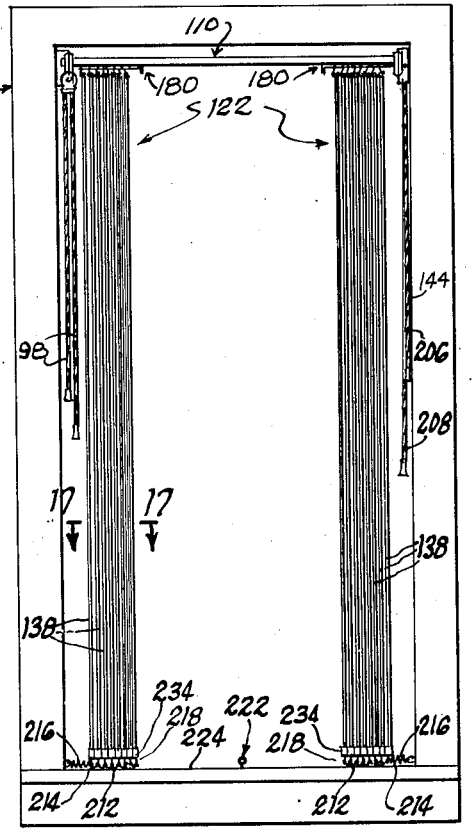
Fig. 2 is a similar view, but with the groups of slats parted to reveal an intermediate expanse of window.
Figure 13:
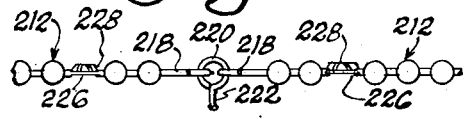
Fig. 13 is an enlarged view of a portion at the lower front of Fig. 1.
Figure 14:
Fig. 14 is a top plan view of the structure shown in Fig. 13.

Figs. 27 and 28 are top plan and end elevational views taken as indicated by the lines 27—27 and 28—28, respectively, in Fig. 26.

Referring now more particularly to the drawings, disclosing illustrative embodiments of the invention, there is shown at 30 a window casing or frame to each jamb 32 and 34 of which an installation bracket 36 is secured as by screws 38. Each bracket 36 has a top intermediate depression 40 forming with the adjacent jamb an upwardly opening socket 42 and also has a bottom upwardly opening socket 44.

Removably mounted on the installation brackets 36 are end bearings 48 and 50. Each end bearing comprises outer and inner cover parts 52 and 54. The cover part 52 is U-shaped and in use is arranged with its bight 56 vertical and has outwardly extending upper and lower arms 58 and 60 with down-bent lips 62 formed to seat in the respective sockets 42 and 44, sufficient clearance being afforded at 64 to permit installation and removal of the bearings 48 and 50. The bight 56 and inner cover part 54 are each formed with stepped concentric annular outward depressions 64 and 66, the latter terminating in circular inner peripheral edges 68, and with two lower alined horizontal semi-tubular outward depressions 70 and with a hole 72 separating the depressions 70 and notching the adjacent portion of the annular depression 64. The bight 56 and inner cover part 54 are thus complemental to each other, and, when united, as by rivets 76, are adapted to journal tilt gears 78 and 80 and worm shafts. Although only one worm shaft 82 is employed, both end bearings 48 and 50 and the gears 78 and 80 supported thereby are preferably identical to minimize the number of different dies necessary.

Each gear may be formed of a pair of shallow cup members 84 spot welded together as at 86 or otherwise suitably united and affording a rim flange 88 in which its teeth 90 are cut.

A worm 94 for cooperating with the tilt gear 78 is force fitted or otherwise suitably fixed to an intermediate portion of the worm shaft 82, and a tilt pulley 96, actuated by a tilt-cord 98, is fixed to an end portion of the shaft. A tilt-cord guide 100 is swiveled about the shaft 82.

It will be noted that the gear flange 88 has smooth sliding engagement with the flat mutually facing surfaces of the depressions 64, and there is smooth cylindrical surface sliding engagement between the bearing edges 68 and the cylindrical surface 102 of the gear so that the bearings 48 and 50 serve as journals for the gears, the worm shaft 82 being journaled in the support 48. Lubricant may be added as needed.

The halves of each gear are formed with registering eccentric holes 104 of suitable configuration, for example of generally semi-circular formation, with a major portion 106 and a communicating notch 108 whose purpose will appear. The tilt tube, shown at 110, is of a cross-section to conform with the portion 106 of the hole 104, and accordingly in the illustrated embodiment of the invention is substantially half-round, and is formed to have a sliding telescopic fit in said portions of the two gears 78 and 80, and to rotate with the gears, but in an orbit about the axis 112 of the gears.

The tube 110 has co-planar lips 114 extending toward each other and defining a slot 116 running throughout the length of the tube for the reception of sliders 118, each slider being formed with opposite co-planar grooves 120 in which the lips 114 are slidably received.

Although in accordance with the invention there may be provided a single group of vertical slats extending throughout the width of the window casing, with means for bunching all of them toward one side of the window to reveal the window at the other side, we have chosen for illustrative purposes an arrangement in which a pair of slat groups or units 122 is provided, with means for bunching them toward the respective window jambs to afford an unobstructed view through the intermediate portion of the window, as will appear.

All of the sliders 118 of each group 122 are connected in a string by a tape 124 fastened by rivets 126 to such sliders, and the ends 127 of an individual relatively short tape 128, looped through the upper slotted end of a hook 130, are secured preferably by one of said rivets and a tape-clamping washer 132 to each slider. Each hook 130 is releasably received in a centered hole 134 in the upper end 136 of a slat 138 in a manner to releasably support the slat and to cause the slat to rotate therewith. The slats 138 may be formed of sheet aluminum, steel or other metal, or of wood, plastic or other suitable material, but are preferably formed of sheet steel transversely bowed substantially as shown. The slats 138 may be of any suitable width, a preferred width being two inches, in which event the sliders 118, when fully spaced from one another in each string, are arranged 1⅝" on centers, so that the slats lap one another ⅜" when fully overlapped.

A support in the form of a clip 140 is provided for the looping sheave 142 for the traverse cord 144, said clip having an end hook 146 which receives the adjacent ends of the tilt tube lips 114, the shank 148 of the clip extending within the tube and in substantial engagement with the lips and having an arched portion to which the sheave is loosely riveted as at 150. The clip shank 148 is formed with laterally projecting lugs 154 terminating adjacent the sides of the tube to preclude substantial shift of the clip 140. The hook terminal 156 is of a thickness and width such as to readily pass through the gear notches 108 when the tube 110 and tilt gear 78 are being assembled.

The bight 56 of the outer cover part of the end bearing 50 has a pair of horizontally spaced vertically extending ears 162 to which is riveted a pin 164 about which a traverse cord engaging and guiding roller or sleeve 166 is freely rotatable, the upper portion of the sleeve projecting sufficiently above the axis 112 of the gears 78 and 80 to position the two runs of the traverse cord 144 side by side in line with the interior of the tilt tube 110 irrespective of the position of the tube, so that the traverse cord will not be fouled by the tube. As the tube 110 tilts, the traverse cord portions engaging the sleeve 166 may shift with the intervening washer 168, disposed about the sleeve, toward or away from the window pane, depending on the direction of tilt, but this shift will not affect the efficiency of operation of the cord 144.

For centering the blind and anchoring the runs of the traverse cord 144, there is provided a pair of identical plates 180, each plate being bent into the shape of an L, affording thereby a leg 182 and a relatively short flange 184. Each leg 182 has opposite marginal notches 186 remote from the flange 184, leaving a narrow stem 188 adapted to fit within the inner end slider 118 of the respective slider string adjacent the slider web 190, and adjacent but outside of the tube slot 116, with the inner marginal faces of the leg arranged for sliding engagement with the outer faces of the tube lips 114 and to straddle the wings 192 of the slider so as to interlock the plate 180 and slider against relative movement. The leg portion adjacent the flange 184 is formed with a longitudinal tunnel 200 projecting in the direction opposite to that in which the flange projects, and in substantial alinement with the stem 188, and is also formed with a marginal cord lock prong 202 projecting in the direction opposite to that of the tunnel 200 and substantially offset laterally from and in a plane parallel to the axis of the tunnel and of a width substantially less than the length of the tunnel and flanking the intermediate portion, only, of the tunnel. When the plate 180 is installed, the flange 184 and lock prong 202 project away from the tube 110, and the tunnel 200 projects through the tube slot 116 and into the interior of the tube. The plate 180 is assembled with the inner end slider 118 of the respective slider string merely by passing the slider wings through the plate notches 186 to locate the plate stem 188 at the slider web 190, and thus the sliding of the slider into the tube 110 automatically effects assembly of the plate with the tube.

Figure 15:
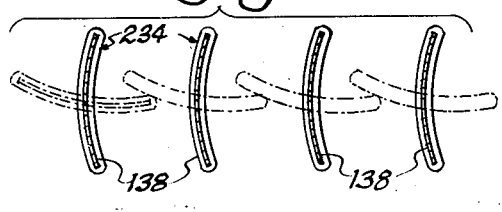
Fig. 15 is an enlarged sectional view taken as indicated by the line 15—15 in Fig. 1.
Figure 16:
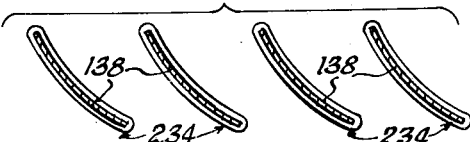
Fig. 16 is a similar view, with the slats tilted about half way from the Fig. 15 position.
Figure 12:
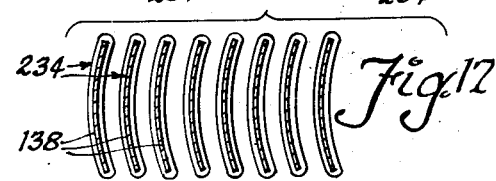
Fig. 12 is an enlarged isometric view of a slider shown in other views.

With the tube 110 free of the end supports or gears 78 and 80, the traverse cord 144 is passed through the tunnels 200, emerging from each tunnel adjacent the flange 184, the plates 180 are assembled with the inner end sliders 118, the sliders are slipped into the tube slot 116, the traverse cord between the tunnels is looped about the sheave 142, the sheave clip 140 is hooked to the left end of the tube, and, with the slider strings fully extended so that the plate flanges abut each other at substantially the center of the tube (Figs. 1, 8, 15 and 16), and the ends 206 and 208 of the cord pulled taut, the portions of the cord extending in the tunnels are forced aside in opposite directions and forcibly looped about the prongs, in biting engagement with the prong edges and with the plate edges at the ends of the tunnels. With the runs of the traverse cord 144 extended over the sleeve 166, the ends of the tube 110 are now telescoped through the gears 78 and 80, the tilt gear 78 clearing the sheave clip hook terminal 156 as noted above. The end bearings 48 and 50 are then slipped into place on the installation brackets 36, and the several slats 138 are coupled with the tape hooks 130.

The plates 180 are so dimensioned that, when their flanges 184 abut each other, the distance between the centerlines of the tape anchoring rivets 126 secured to the inner end sliders 118 is equal to the space between the centerlines of the successive rivets of each slider string, so that all of the slats throughout the width of the window are substantially uniformly spaced in succession. (If the window is an inch or so too narrow, the traverse or draw tapes 124 will not be fully stretched between the outermost two rivets, so that when the slats are fully lapped, the outermost two slats will overlap more than the remaining slats.)

A chain 212, such as a bead chain, extends horizontally below the lower ends of the slats 138 of each group 122, the outer end 214 of each chain being connected as by a spring 216 to the adjacent window casing jamb, and the inner ends of the chains being provided with hooks 218 adapted to be releasably looped through the eye 220 of an eye bolt or stud 222 secured centrally of and projecting upward from the window casing sill 224. When the inner ends of the chains are thus held, the chains extend substantially in a straight horizontal line. Each chain 212 according to one form of the invention includes socket links 226 having the same spacing on centers as the tape-anchoring rivets 126, such that when the slider strings and chains are fully extended (Fig. 1), as well as at all other times, the axes of the eyes 228 of said links are substantially in line with the centerlines of the respective slats. The eyes 228 constitute snap fastener sockets through which the knobs 230 of mating elements 232 are snapped. The elements 232 are riveted to the centers of the bottoms of caps 234 formed to readily and releasably receive and embrace the lower ends of the slats, said caps being formed of soft rubber, soft plastic or other suitable soft material so that when the slats are tilted into close overlapping relation they will not rattle inasmuch as they will not contact one another, but instead contact will take place between the caps and such contact is noiseless. Each slat 138, moreover, may be assembled with the holding means therefor simply by inserting the lower end of the slat in the cap 234 provided therefor and slipping the upper end of the slat onto the corresponding tape hook, and it is manifest that the slat may be removed with practically a single motion, involving merely the removal of the slat from the tape hook. It is accordingly obvious that the task of applying and removing the slats is an exceedingly quick and easy one.

When the tube 110 is arranged with its lips 114 in a horizontal plane at the bottom of the tube, the intermediate portion 240 of each tape 128 and consequently the longitudinal edges of each slat 138 extend in planes substantially normal to the window pane. When the tilt cord is pulled and accordingly the tube 110 is turned from the position just noted, each tape 128 follows the path of least resistance pursuant to the gravity pull of the slat suspended thereby, with the result that the tape folds more and more acutely adjacent the rivet 126 by which it is anchored, and the fold line changes from one which falls in a plane normal to the tube axis to one which falls in planes more and more acutely inclined to the tube axis, said tape portions 240 turning more and more toward a common plane, and thus likewise turning the slats 138 so that when the tape portions lie substantially in a plane parallel to the tube axis, the slats are in fully overalpped relation, virtually blocking passage of light therebetween. The tube 110 will remain in any position to which it is adjusted by the tilt cord.

When it is desired to part the slat groups 122, all that is necessary is that the chain hooks 218 be removed from the eye 220 of the stud 222, and the traverse cord 144 pulled in the dierction to move the cord lock plates 180 toward the respective window jambs, the slats remaining at the same angles to the window pane at which they extended when the traverse cord pull commenced. The slat groups 122 may be parted to any extent up to the limit without affecting the tilt of the slats, and even while the slats are being tilted by the tilt cord, and the slats may be tilted without affecting the extent to which the slat groups are parted.

In the construction disclosed in our said co-pending application, the riveted portions of the slat-suspending tapes are remote from the axis about which the tilt tube turns, with the result that said tape portions rise and descend harmonically with the corresponding tilting of the tube, thus raising and lowering the slats with the result that when it is desired to block all light, and thus the slats are turned until they are fully overlapped, the slats are elevated to such an extent that light enters between the slat bottoms and the window sill. It is preferable that the slats be maintained at all times so that they neither rise nor descend. To this end, in accordance with the present invention, the riveted portions 127 of the slat-suspending tapes 128 are substantially bisected by the gear axis 112 and thus remain so bisected irrespective of the degree of tilt or the nontilt of the tube, so that there is no appreciable rise or descent of said tape portions, and consequently no rise or descent of the slats notwithstanding tilting of the tube.

Instead of providing a single sleeve or roller over which the traverse cord 144 runs, we may employ a pair of sheaves 240 (Figs. 23 and 24), one for each run of the cord, the sheaves being loosely flanked by washers 242 and rotatably mounted on a sleeve 244 rotatable about and slidable along the supporting pin 164. With this construction, as with that above described, rubbing between the adjacent runs is precluded regardless of the tilt or nontilt of the tube 110.

Another traverse cord guide roller construction is shown in Fig. 25, wherein two deeply flanged sheaves 246 having the same function as the sheaves and flanking washers of Figs. 23 and 24 are employed.

We may replace the eye bolt 222 with a permanent magnet and the chain hooks with armatures which may be moved by hand into and out of the field of the magnet.

Instead of the chains above described, we may employed bead chains 248 to which are attached snap fastener socket clips 250 whose sockets 252 are in the same spacing as the sockets of the above described chains. Each such socket clip 250 may be in the form of a U-shaped piece whose arms have slits 254, providing each arm with contiguous tangs 256 which may be sprung apart as they are forced over the wire links 258 of the chain, each slit terminating inwardly in a hole 260 for the reception of one of the wire links, the tangs snapping together when the wire links are disposed in the holes, to lock the clip to the chain.

The conventional Venetian blind is so constructed that it fits a window of predetermined size and shape, and cannot be changed at all, or certainly not by an unskilled person, to fit a window of different size or shape, so that when a person moves to another house or apartment where the windows are of different size or shape, the Venetian blinds used in the prior home are useless to him and he must undergo the very considerable expense of furnishing his new home with a new set of Venetian blinds.

These disadvantages are not present in our construction.

If the new window is of substantially greater height than that for which a given Venetian blind of the present invention is designed, but of substantially the same width, all that is necessary is that a new set of slats of appropriate length, and nothing else, be purchased and substituted for the original slats.

If the new window is of substantially less height than but of substantially the same width as the old one, nothing need be purchased, since all that is necessary is that the lower ends of the slats 138 be sheared off with a scissors or shears to proper length and slipped into the caps 234, no skill being required. Since the bottoms of the slats are hidden by the caps, it is unnecessary to round off the bottoms of the slats.

If the new window is of substantially the same height as the old one, but substantially wider, it is necessary merely to replace the old tilt tube, slider strings, traverse cord locks and secured tapes with slat-suspending hooks with a new like assembly of the proper length with the proper number of hooks, to purchase also the number of additional slats needed, and two pieces of chain including caps to accommodate the additional slats. These parts may be purchased and readily installed and assembled by the housewife, the original chains being first uncoupled from the end springs and the additional chain sections inserted and coupled to the original chains and springs as by means of conventional bead chain snap-fastener coupling sleeves found on key chains, for example, such sleeves being readily purchasable.

If the new window is of substantially the same height as the old one, but substantially narrower, all that need be done is to saw off an end of the tilt tube to bring the tube to the correct length, snip off the outer end portions of the draw tapes 124 to remove the proper number of hooks 130, snip off the outer end portions of the chains to remove the same number of caps 234 and recouple the chains to the end springs, and remove the same number of end slats.

As is evident from the foregoing, even in manufacture it is not necessary to give the bottoms of the slats any special attractive finish, such for example as rounding them as shown, inasmuch as in use they are concealed by the caps 234.

It is also apparent from the foregoing that to adapt a given vertical Venetian blind according to our invention from one window to another of different height or width or both height and width, the corresponding changes as noted above are all that are required, none requiring any skill, so that it is unnecessary either to purchase a new Venetian blind or to engage the services of a Venetian blind installing expert. And, whatever changes may be needed, they in no event will involve the installation brackets, the end bearings, the end supports (into which the tilt tube is removably telescoped), the tilt gear driving mechanism, and the traverse cord with its looping sheave and clip and the traverse cord run guide, all of which remain intact.

It will be observed from the foregoing that we have provided a construction which involves few differently shaped parts, thus requiring few different dies, the parts being readily assembled and disassembled, the slats remaining at the same height notwithstanding the degree of tilt, and the axes of tilt of the slats lying in substantially the same vertical plane for all positions of the slats. If desired, the sheave clip may be arranged at the end of the tilt tube opposite that adjacent which the tilt gear 78 is located, and the traverse cord ends similarly reversed, to locate both the tilt cord and the traverse cord ends adjacent the same side of the window, either right or left, as desired, so that, particularly where the window is very wide, and it is desired to adjust the slats at the same time by both traversing and tilting, both operations may be performed by the same person without necessitating his walking from one side of the window to the other to make such adjustments.

Various modifications may suggest themselves to those skilled in the art without departing from the spirit of our invention. Hence we do not wish to be restricted to the specific forms shown or uses mentioned, except to the extent indicated in the appended claims, which are to be interpreted as broadly as the state of the art will permit.

We claim:

1. A Venetian blind comprising end bearings, means for mounting said bearings at the sides of a window casing with said bearings on a common horizontal axis, supports journaled in said bearings and having identical non-circular holes therethrough, adapted to register with each other, means for turning one of said supports, a tilt rod of non-circular cross-section telescoped in said holes whereby said rod and supports turn in unison, said axis extending outside of and adjacent said rod, said rod having a straight longitudinal slot spaced from and parallel to said axis, a series of sliders supported by said rod and passing through said slot, said sliders having outer exposed substantially coplanar faces extending in a longitudinal series parallel to said axis, and a tape riveted at one end to said face of each slider and having a slat-suspending portion suspended therefrom, said axis passing through the riveted portion of each tape.

2. A Venetian blind comprising end bearings, means for mounting said bearings at the sides of a window casing with said bearings on a common horizontal axis, supports journaled in said bearings and having identical non-circular holes therethrough, adapted to register with each other, means for turning one of said supports, a tilt rod of non-circular cross-section telescoped in said holes whereby said rod and supports turn in unison, said axis extending outside of and adjacent said rod, said rod having a straight longitudinal slot spaced from and parallel to said axis, a series of sliders supported by said rod and passing through said slot, said sliders having outer exposed substantially coplanar faces extending in a longitudinal series parallel to said axis, and a tape riveted at one end to said face of each slider and having a slat-suspending portion suspended therefrom, said axis passing the riveted portion of each tape, said rod being tubular, said sliders being strung in two groups, a traverse cord lock supported by the inner end slider of each group, a U-shaped clip embracing an end of said rod, a traverse cord looping sheave carried by an arm of said clip and located within said rod end, the support adjacent said rod end having a notch communicating with the hole therein and of a size to enable the other arm of said clip to pass through said support as said rod is telescopically assembled with said support, and a traverse cord locked to said cord locks and looped about said sheave, and passing out of the other end of said rod.

3. In a Venetian blind, end bearings, means for mounting said bearings at the sides of a window casing with said bearings on a common horizontal axis, supports journaled in said bearings and having identical non-circular holes adapted to register with each other, means for turning one of said supports, a tilt tube having non-circular end portions fitting and telescoped through said holes so that said supports and tube turn in unison, a U-clip receiving an edge portion of an end of said tube and having an arm disposed within said tube end, a traverse cord looping sheave carried by said arm and disposed within said tube end, the adjacent support having a notch communicating with said hole therein and of a size to enable the other arm of said clip to pass through said adjacent support as said tube is telescopically assembled with said supports, said tube having a straight slot throughout its length, sliders strung in two groups in a single line supported by said tube and passing through said slot, a slat-suspending tape suspended from each slider, a traverse cord lock supported by the inner end slider of each group, and a traverse cord locked to said cord locks and looped about said sheave and passing out of the other end of said tube.

4. In a vertical Venetian blind, installation brackets having upper and lower sockets open at the top and closed at the sides, coaxial end bearings having depending fingers releasably seated in said sockets, end supports journaled by said bearings, one of said supports being a tilt gear, said end supports having non-circular eccentric holes therethrough parallel to said axis, a tilt tube wholly outside said axis and telescoped in said holes so as to turn in unison with said end supports, said tube thus turning orbitally about said axis, a string of sliders carried by said tube, slats suspended from portions of said sliders adjacent said axis, a traverse cord locked to an end slider with the runs of said cord emerging from an end of said tube, a cylindrical roller carried by the bearing adjacent said end of said tube and rotatable about a substantially horizontal axis substantially normal to the window pane, the upper outer surface of said roller being in line with the interior of said tube regardless of the tilt adjustment of said tube, said cord runs passing over said roller and being slidable laterally along said roller while in line with the interior of said tube regardless of the tilt adjustment of said tube.

5. In a vertical Venetian blind, installation brackets having upper and lower sockets open at the top and closed at the sides, coaxial end bearings having depending fingers releasably seated in said sockets, end supports journaled by said bearings, one of said supports being a tilt gear, said end supports having non-circular eccentric holes therethrough parallel to said axis, a tilt tube wholly outside said axis and telescoped in said holes so as to turn in unison with said end supports, said tube thus turning orbitally about said axis, a string of sliders carried by said tube, slats suspended from portions of said sliders adjacent said axis, a traverse cord locked to an end slider with the runs of said cord emerging from an end of said tube, and roller means carried by the bearing adjacent said end of said tube and rotatable about a substantially horizontal axis substantially normal to the window pane, the traverse cord runs engaging and passing over said roller means and being shiftable longitudinally of the axis of said roller means while engaged with said roller means and in line with the interior of said tube regardless of the degree of tilt of said tube.

6. In a vertical Venetian blind structure, a supporting member supported for revolution about a fixed horizontal axis, said axis being located parallel to and exteriorly of said supporting member, a tape secured to said supporting member in slideable relation thereto such that the said axis passes substantially through the point of securement, and a slat depending from said tape.

7. In a vertical Venetian blind structure, a supporting member supported for revolution about a fixed horizontal axis, the said member being parallel to and slightly spaced from said axis, a plurality of tapes, slideable means securing said tapes in depending relation to said member whereby the said axis passes substantially medially through the points of securement, and a slat depending from each of said tapes.

8. In a vertical Venetian blind structure, a supporting member supported for revolution in an orbit about a fixed horizontal axis, a plurality of tapes, slideable means securing said tapes in depending relation to said member, said axis passing substantially medially through said slideable means substantially at the points of securement, and a slat depending from each of said tapes.

9. A vertical Venetian blind comprising end supports, each adapted for mounting on a respective side of a window casing, the said supports being co-axially alined and rotatable about a horizontal axis, an elongated supporting member supported in said supports for revolution in an orbit about said axis, a plurality of tapes, slideable means securing said tapes serially in depending relation to said supporting member, a slat depending from each of said tapes, said axis passing substantially medially through each point of securement whereby as said supporting member is caused to be rocked about its axis all of said tapes will be caused to twist and all of said slats will be caused to rock about their respective longitudinal axes without any appreciable longitudinal movement.

10. In a vertical Venetian blind, a supporting member mounted for rocking about a horizontal axis located parallel to and exteriorly of said member, means for rocking said member about said axis, a plurality of tapes arranged in series longitudinally of said member, a slat depending from each of said tapes, slideable means securing each tape in depending relation to said member, said axis passing substantially through the points of securement of the tapes to said member whereby as said member is caused to be rocked about its axis all of said tapes will be caused to twist and all of said slats will be caused to rock about their respective longitudinal axes without any appreciable longitudinal movement.

11. A vertical Venetian blind comprising end bearings, means for mounting said bearings at the sides of a window casing, supports journaled in said bearings on a common horizontal axis, means for turning one of said supports, a tilt rod having its ends supported in said supports and disposed eccentric to said axis whereby said rod and supports turn in unison, said axis being outside of and adjacent said rod, said rod having a straight longitudinal slot spaced from and parallel to said axis, a series of sliders supported by said rod and passing through said slot, said sliders having outer exposed substantially co-planar faces extending in a longitudinal series parallel to said axis, and a tape secured at one end to the face of each slider and having a slat-suspending portion suspended therefrom, said axis passing through the secured portion of each tape.

12. A vertical Venetian blind comprising end bearings, means for mounting said bearings at the sides of a window casing, supports journaled in said bearings on a common horizontal axis, means for turning one of said supports, a tilt rod having its ends supported in said supports and disposed eccentric to said axis whereby said rod and supports turn in unison, said axis being outside of and adjacent said rod, said rod having a straight longitudinal slot spaced from and parallel to said axis, a series of sliders supported by said rod and passing through said slot, said sliders having outer exposed substantially co-planar faces extending in a longitudinal series parallel to said axis, a tape secured at one end to the face of each slider and having a slat suspending portion suspended therefrom, said axis passing through the secured portion of each tape, said rod being substantially tubular, said sliders being arranged in two groups, a traverse cord lock supported by the inner end slider of each group, a clip engaging an end portion of said rod, a traverse cord looping sheave carried by said clip and located within said rod end, and a traverse cord locked to said cord locks and looped about said sheave and passing out of the other end of said rod.

13. In a vertical Venetian blind, installation brackets adapted for mounting at opposite sides of a window casing, co-axial end bearings supported in said brackets, end supports journaled in said bearings, one of said supports being a tilt gear, said end supports having non-circular eccentric apertures parallel to said axis, a tilt tube wholly outside said axis and received in said apertures so as to turn in unison with said end supports, said tube thus turning orbitally about said axis, a string of sliders carried by said tube, slats suspended from portions of said sliders adjacent said axis, a traverse cord locked to an end slider with the runs of said cord emerging from an end of said tube, traverse cord guide means carried by the bearing adjacent the end of said tube, said guide means being in alignment with the interior of said tube at all positions of said tube and said cord runs passing over said guide means.

References Cited in the file of this patent

UNITED STATES PATENTS

| | | |
|---|---|---|
| 1,649,943 | Boeck | Nov. 22, 1927 |
| 1,841,065 | Simon | Jan. 12, 1932 |
| 2,107,421 | Lennox | Feb. 8, 1938 |
| 2,173,275 | Houmere | Sept. 19, 1939 |
| 2,202,293 | Lawson | May 28, 1940 |
| 2,297,627 | Loehr | Sept. 29, 1942 |
| 2,402,769 | Nelson | June 25, 1946 |
| 2,422,407 | Green | June 17, 1947 |
| 2,498,909 | Bradley | Feb. 28, 1950 |
| 2,503,441 | Kamm | Apr. 11, 1950 |
| 2,785,745 | Toti | Mar. 19, 1957 |